United States Patent
Tremblay et al.

(10) Patent No.: US 10,695,740 B2
(45) Date of Patent: Jun. 30, 2020

(54) METHOD AND DEVICE FOR CONTROLLING AN OZONE GENERATOR POWER SUPPLY

(71) Applicant: IMALOG INC., Montreal (CA)

(72) Inventors: Marco Tremblay, Montreal (CA); Antonio Di Schiavi, Kirkland (CA)

(73) Assignee: IMALOG INC., Montreal (CA)

( * ) Notice: Subject to any disclaimer, the term of this patent is extended or adjusted under 35 U.S.C. 154(b) by 646 days.

(21) Appl. No.: 15/030,398

(22) PCT Filed: Nov. 24, 2014

(86) PCT No.: PCT/CA2014/051115
§ 371 (c)(1),
(2) Date: Apr. 19, 2016

(87) PCT Pub. No.: WO2015/074155
PCT Pub. Date: May 28, 2015

(65) Prior Publication Data
US 2016/0250614 A1    Sep. 1, 2016

Related U.S. Application Data (60) Provisional application No. 61/908,437, filed on Nov. 25, 2013.

(51) Int. Cl.
*B01J 19/08* (2006.01)
*C01B 13/11* (2006.01)

(52) U.S. Cl.
CPC ............. *B01J 19/088* (2013.01); *C01B 13/11* (2013.01); *C01B 13/115* (2013.01); *C01B 2201/90* (2013.01)

(58) Field of Classification Search
None
See application file for complete search history.

(56) References Cited

U.S. PATENT DOCUMENTS 3,800,210 A    3/1974  Caussin
4,424,557 A    1/1984  Steigerwald
(Continued)

FOREIGN PATENT DOCUMENTS

EP    0831679 A1    3/1998

OTHER PUBLICATIONS

Eliasson el al., Modelling of Dielectric Barrier Discharge Chemistry, Pure & Appl. Chem., 1994,pp. 1275-1286, vol. 55, No. 6, Great Britain.

(Continued)

*Primary Examiner* — Kishor Mayekar
(74) *Attorney, Agent, or Firm* — Norton Rose Fulbright Canada LLP; Reno Lessard (57) ABSTRACT

The power supply unit for an ozone generating system generally has a pulsed current generator generating current pulses to be supplied to an ozone generator; and a computer adapted for obtaining an ozone yield based on a first amount of ozone to be generated by the current pulses during a first period of time and on a first amount of electricity consumed by the power supply unit during the first period of time; modifying an amplitude of the current pulses based on the ozone yield; obtaining an ozone production rate based on a second amount of ozone generated during a second given period of time; adjusting a frequency of the current pulses based on the ozone production rate; and wherein said steps are executed iteratively to enhance the ozone yield while meeting the ozone production rate.

8 Claims, 8 Drawing Sheets

(56) References Cited

U.S. PATENT DOCUMENTS

| | | |
|---|---|---|
| 4,680,694 A | 7/1987 | Huynh et al. |
| 4,682,266 A | 7/1987 | Huynh et al. |
| 4,752,866 A | 6/1988 | Huynh et al. |
| 4,790,980 A | 12/1988 | Erni et al. |
| 4,864,483 A | 9/1989 | Divan |
| 5,130,003 A | 7/1992 | Conrad |
| 5,135,725 A | 8/1992 | Hendrickson et al. |
| 5,278,492 A | 1/1994 | Huynh et al. |
| 5,285,372 A | 2/1994 | Huynh et al. |
| 5,287,262 A | 2/1994 | Klein |
| 5,442,800 A | 8/1995 | Dunder |
| 5,630,990 A | 5/1997 | Conrad et al. |
| 5,770,168 A | 6/1998 | Carlsten et al. |
| 5,877,613 A | 3/1999 | Hoogendijk |
| 5,932,116 A | 8/1999 | Matsumoto et al. |
| 5,936,358 A | 8/1999 | Okamoto et al. |
| 6,011,708 A | 1/2000 | Doht et al. |
| 6,093,289 A * | 7/2000 | Kuzumoto .............. C01B 13/11 204/176 |
| 6,143,256 A | 11/2000 | Shinagawa et al. |
| 6,501,234 B2 | 12/2002 | Lin et al. |
| 7,294,974 B2 | 11/2007 | Moyer et al. |
| 7,312,584 B2 | 12/2007 | Tamita et al. |
| 2010/0101936 A1* | 4/2010 | Hansson .............. H02M 7/5381 204/176 |

OTHER PUBLICATIONS

Esteve et al., Using Pulse Density Modulation to Improve the Efficiency of IGBT Inverters in Induction Heating Applications, 2007, pp. 1370-1373, IEEE, Spain.

Fridman, Alexander, Plasma Chemistry, Cambridge University Press, 2008, United Kingdom.

2007 Product Booklet, Plasma Technics Inc., Wisconsin.

* cited by examiner

METHOD AND DEVICE FOR CONTROLLING AN OZONE GENERATOR POWER SUPPLY

FIELD

The improvements generally relate to the fields of ozone generation, excimer laser, corona surface treatment and/or any other field involving dielectric discharges, and more particularly relate to the field of ozone generation using pulsed corona discharges.

BACKGROUND

Ozone generating systems typically include an ozone generator having spaced apart conducting parallel plates separated with a dielectric isolator, and which are electrically charged and opposite from one another to generate pulsed corona discharges which, in turn, transform some of the oxygen circulating therebetween into ozone. The pulsed corona discharges are caused by current pulses. Typically the current pulses have a positive polarity portion and a negative polarity portion which enables reversal of the polarity of the ozone generator. The electrical power of the ozone generator is typically provided by a specialized power supply unit.

Ozone generating systems are selected as a function of the maximum ozone production rate they can produce. The ozone production rate is affected by environmental factors such as temperature and gas pressure and composition, and standards can be provided to rule such parameters out of the equation. The maximum ozone production rate is also affected by the design of the ozone generator, including the gap width, the dielectric material used, its surface finish, electrode material, the dielectric surface dimension, tolerance, cooling system, concentration etc. Furthermore, the maximum ozone production rate is affected by the current pulses provided by the power supply unit, including a current density, a pulse width, a frequency, a generator voltage, a power used, etc. Of course, with time, the maximum ozone production rate can deplete due to factors such as oxide buildup, loss of dielectric surface and contamination, but clients typically expect a given maximum ozone production rate upon purchase.

Many ozone generating systems are not always used at maximum capacity, and therefore they are often designed with means to control the ozone production rate below the maximum capacity (e.g. at a given % of the maximum capacity), within the full range of operation of the system. One approach is to control the ozone production rate by adjusting the current amplitude. Another approach is to control the ozone production rate by adjusting the frequency.

The yield of ozone generating systems can be evaluated in terms of a mass of ozone generated vs. an amount of electrical power consumed. While the yield of prior art ozone generating systems was typically good at certain % of maximum capacity, there remained room for improvement.

SUMMARY

Ozone generating systems are typically also adjustable in terms of concentration of ozone produced (e.g. 6% concentration relative to oxygen, 12%, etc.). Indeed, producing ozone at higher concentration will typically require less oxygen, but more electricity, and vice-versa. The optimal concentration of ozone can thus vary depending from country to country, depending on the relative costs of oxygen and electricity. A factor which poses challenges in the quest for improved overall ozone yields when considered over the entire range of operation (i.e. at varying % of maximum capacity), is the fact that the optimal current amplitude and frequency from the yield perspective of ozone generation, will typically further vary depending on the selected ozone concentration. For instance, up to 75% of the energy supplied to the generator is converted to heat. Some of this heat is generated when some molecules of ozone are destroyed. Ozone destruction increases rapidly with the ozone concentration.

The power supply unit described herein has a computer which can automatically perform an amplitude control loop and/or a frequency control loop. Particularly, the power supply unit can adjust the current amplitude, and/or the frequency, as a function of the monitored ozone yield, in order to be able to optimize the yield of ozone production independently of factors such as requested ozone production rate (% of maximum capacity), concentration of ozone produced, and varying process parameters such as temperature or pressure variations, oxide buildup on surfaces, contamination, loss of dielectric surface, etc. By doing so, the amount of electrical energy consumed by the ozone generating system can be reduced, along with the cost associated with cooling systems mounted thereon.

In accordance with one aspect, there is provided a power supply unit for powering an ozone generator based on a desired ozone production rate determined by a user, the power supply unit comprising: a pulsed current generator for supplying current pulses to drive the ozone generator; and a computer connected to the pulsed current generator and adaptable to retrieve an amount of ozone generated and an amount of electricity consumed; the computer having a readable memory having recorded thereon instructions for execution by the computer, the instructions comprising the steps of: determining a first ozone yield based on both an amount of ozone generated and an amount of electricity consumed during a first period of time during which the ozone generator is driven by the pulsed current generator at a first amplitude and a first frequency of the current pulses; modifying one of the first amplitude and the first frequency of the current pulses based on the determined ozone yield; determining a second ozone yield based on both an amount of ozone generated and an amount of electricity consumed during a second period of time during which the ozone generator is driven by the modified current pulses; and effecting one of remodifying and maintaining the modified current pulses based on the second ozone yield determined; wherein said instructions include repeating the steps iteratively to enhance the ozone yield.

In accordance with another aspect, there is provided a power supply unit for an ozone generating system, the power supply comprising: a pulsed current generator for generating current pulses to be supplied to an ozone generator, the current pulses having a current amplitude and a frequency; and a computer connected to the pulsed current generator and adaptable to retrieve operating conditions from the ozone generator; the computer having a readable memory having recorded thereon instructions for execution by the computer, the instructions comprising receiving a desired ozone production rate to be determined by an ozone generator user; supplying current pulses to the ozone generator; determining an ozone yield based on a mass of ozone generated and an amount of electricity consumed during a first period of time; modifying one of an amplitude and a frequency of the current pulses based on the ozone yield; determining a second ozone yield based on the modified current pulses; and effecting one of remodifying and maintaining the modified current pulses based on the second ozone yield determined; and wherein said instructions are to be executed iteratively to enhance the ozone yield and the ozone production rate.

In accordance with another aspect, there is provided a method for controlling a power supply unit for an ozone generator, the method comprising: receiving a desired ozone production rate to be determined by user; supplying first current pulses of a given amplitude and given frequency to the ozone generator during a first period of time to generate ozone at the desired production rate; obtaining an amount of ozone generated during the first period of time; obtaining an amount of electricity consumed during the first period of time; determining a first ozone yield based on both the amount of ozone generated and the amount of electricity consumed during the first period of time; modifying one of the amplitude and the frequency of the first current pulses based on the first ozone yield; supplying the modified current pulses to the ozone generator during a second period of time; obtaining an amount of ozone generated during the second period of time; obtaining an amount of electricity consumed during the second period of time; determining a second ozone yield associated to the second period of time; and effecting one of remodifying and maintaining the modified current pulses based on the second ozone yield determined.

In accordance with another aspect, there is provided a method for controlling a power supply unit for an ozone generator, the method comprising: receiving a desired ozone production rate to be determined by an ozone generator user; supplying current pulses to the ozone generator; determining an ozone yield based on a mass of ozone generated and an amount of electricity consumed during a first period of time; modifying one of an amplitude and a frequency of the current pulses based on the ozone yield; determining a second ozone yield based on the modified current pulses; and effecting one of remodifying and maintaining the modified current pulses based on the second ozone yield determined.

Many further features and combinations thereof concerning the present improvements will appear to those skilled in the art following a reading of the instant disclosure.

DESCRIPTION OF THE FIGURES

In the figures.

DETAILED DESCRIPTION

Figure 1:
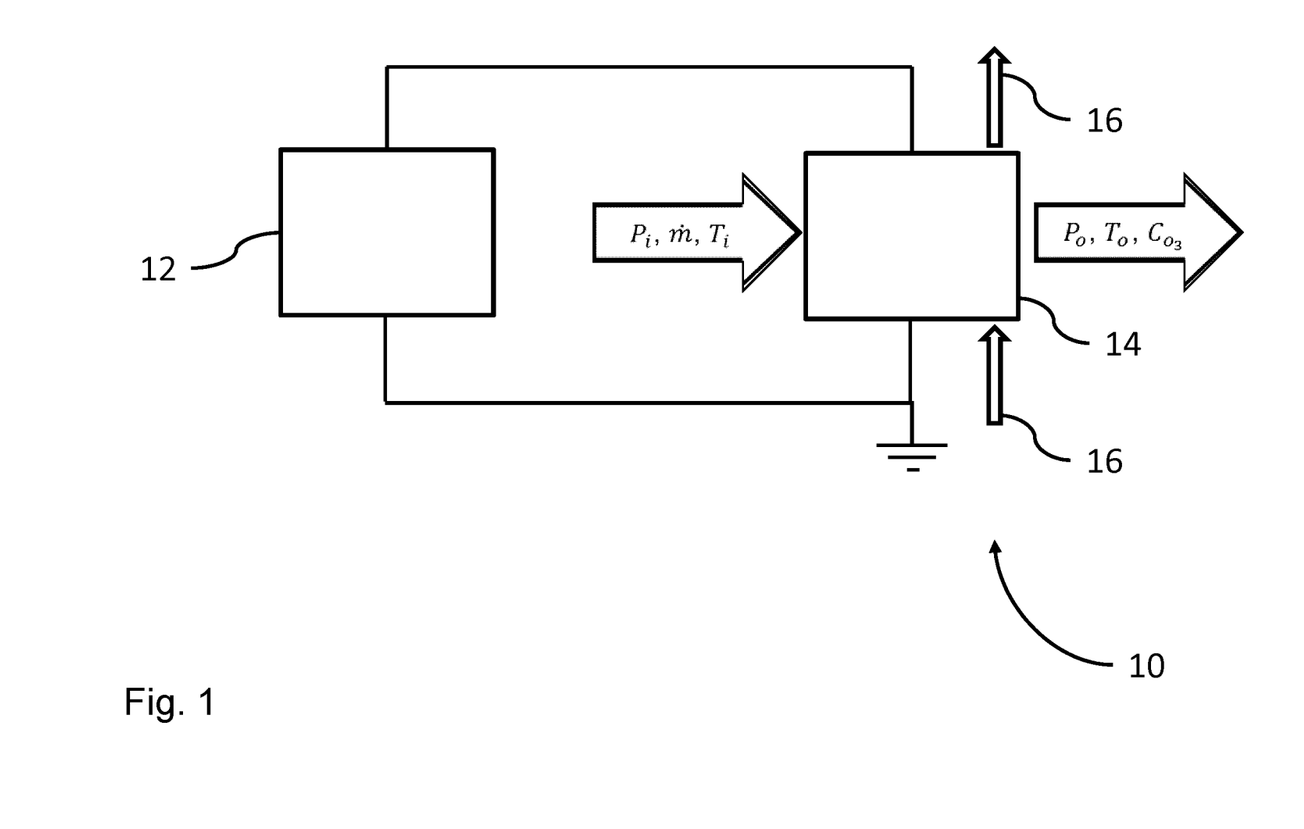
FIG. 1 is a bloc diagram illustrating an example of an ozone generating system.

FIG. 1 shows an example of an ozone generating system 10. The typical ozone generating system includes a power supply unit 12 which is connected to an ozone generator 14. The latter is generally provided in the form of a multitude of radially spaced and longitudinally elongated dielectric tubes disposed in parallel. The dielectric tubes form one set of the electrodes while the opposite electrodes are made of the shell tubes. The power supply unit 12 can be used to provide current pulses to the electrodes of the ozone generator 14, which causes pulsed corona discharges in the volume between the dielectrics and the shell tubes. When an input gas having oxygen therein flows (such as pure oxygen having 99% of oxygen or air having 21% of oxygen, etc) in the ozone generator 14, the pulsed corona discharges transfer energy to the molecules of oxygen. For instance, when the energy transferred is above a threshold of energy, ozone can be generated. Thus, the ozone generator 14 can output an ozonized gas having ozone therein.

Since the efficiency of ozone production is typically around 20%, the electrical power used for the generation of ozone can be high, and the ozone generator 14 is generally cooled by a cooling system. For convenience and maintenance issues, the ozone generator 14 also includes sensors which measure an input pressure ($P_i$) of the input gas, a mass flow rate ($\dot{m}$) of the gas (mass flow rate sensor preferably positioned at the input), an input temperature ($T_i$) of the input gas, an output pressure ($P_o$), an output temperature ($T_o$), and an output ozone concentration ($C_{O3}$) as illustrated by inlet and outlet arrows of FIG. 1.

Of course, the ozone generator 14 can be provided in any form, geometry or shape other than the one described above. For instance, the ozone generator can be as simple as sets of two opposite plates, wherein one or both plate(s) can be separated by a dielectric isolator. However, the form described above is known for having an improved ozone production rate, and therefore, an improved ozone yield.

Particularly, an ozone production rate is defined in this specification as a mass of generated ozone divided by a period of time needed to produce the mass of generated ozone and it can be measured in terms of kilograms per hour (kg/h, g/h, depending on the ozone generating system). Alternatively, the ozone production rate can be obtained by multiplying the mass flow rate and the output ozone concentration (per weight). On the other hand, the ozone yield refers to a mass of generated ozone divided by an amount of electrical energy consumed to produce it. As for the ozone production rate, the ozone yield can otherwise be obtained by multiplying the mass flow rate and the output ozone concentration (per weight) and dividing the result of the product by an input power dissipated by the power supply unit. For instance, the ozone yield can be measured in terms of kilograms per kilowatt-hour (kg/kWh).

As readily understood by one skilled in the art, the production of ozone requires consumption of large quantities of electrical power (or electricity). For this reason, each technical improvement of the power supply unit that can enhance the ozone yield of the ozone generator can save considerable amount of money.

It has been noticed that the ozone yield can depend on the way the current pulses discharges in a gap between the electrodes and the dielectric surfaces of the ozone generator. Indeed, when the discharges are evenly distributed among the intervening surfaces, the ozone yield is found to be increased. Henceforth, as the ozone generator wears (as a function of operating time, mass flow rate, and temperature, for instance) the intervening surfaces can become more rough, which affects the instantaneous ozone yield. This can be seen from an ozone generator operating at a low amplitude current pulses having a peak gap energy slightly over the threshold of energy. In this situation, one may observe corona discharges which are not perfectly distributed along the intervening surfaces and which fluctuates as a function of time upon the flowing gas therein.

On one hand, the typical ozone generator has manufacturing tolerances and inherent surface roughness, thus having perfect intervening surfaces is very unlikely. When the current pulses rises slowly to its peak amplitude, the energy (voltage) in the gap also rises slowly. This allows an area where the gap is narrower to break over first. In this case, an area where the gap is wider will take more time to break over, and these discharges can lead to low energy discharges. As some areas experience high energy discharges, and other areas experience low energy discharges, the ozone production and temperature between the intervening surfaces can vary accordingly. Since high energy discharges can reduce the flow of the gas, this creates a zone having a localized increased temperature and a localized increased ozone concentration, which are two causes that can promote ozone destruction. Thus, controlling the electrical pulsed current is a factor affecting the ozone yield.

Figure 2:
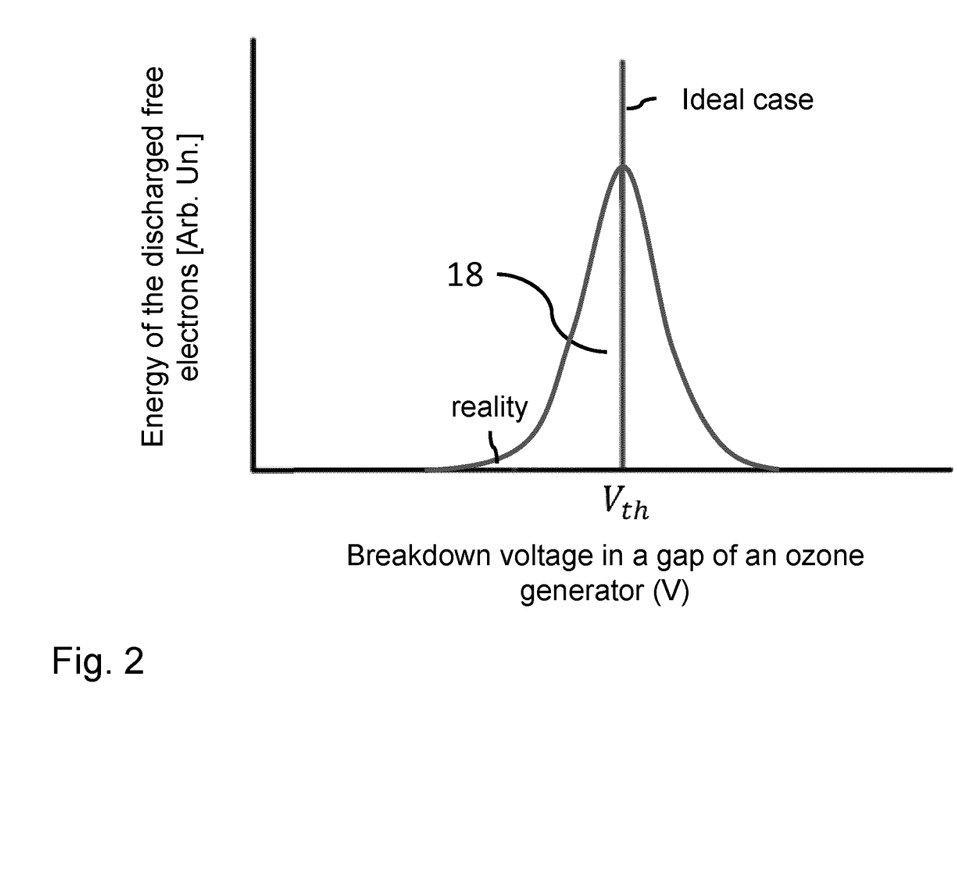
FIG. 2 is a graph showing the energy of the discharged free electrons as a function of a threshold voltage in a gap of an ozone generator.

On the other hand, these fluctuations can lead to low energy discharges that fail to generate ozone by creating low energy electrons, however, these generated low energy electrons can collision with already generated ozone molecules and destroy them in the process. Indeed, when the voltage in the gap is low, some low energy discharges occur below the threshold of energy. A typical threshold voltage can be $3 \times 10^6$ V/m at one atmosphere (1 atm) and roughly twice at two atmospheres (2 atm), commonly used operating pressure. For instance, if the gap width is 0.4 mm, the threshold voltage can be $6 \times 10^6$ V/m*$0.4 \times 10^{-3}$ m=2400 V. Even for a perfectly evenly distributed gap, there is a statistical distribution around the threshold $V_{th}$ of 2400 V and some low energy electrons can be released at lower voltage, as it can be seen in the region 18 on FIG. 2. Indeed, although a majority of the ozone is generated when the applied voltage is higher than the threshold voltage, generation of ozone at voltage slightly lower than the threshold voltage is possible according to statistical effects and plasma physics. However, these low energy electrons may not have enough energy to contribute to the production of ozone, and still have enough energy to destroy already produced ozone molecules.

A distribution of the threshold voltage can be spread over a voltage range resulting from a pressure profile resulting from the flowing gas in the gap. The input pressure can be ten percent higher than the corresponding output pressure. Thus, the distribution of the threshold voltage can vary to up to this ten percent, so as much as 240 V over a longitudinal length of the ozone generator. This large variability of threshold voltages over the intervening surfaces of the ozone generator can result in inefficiency. Therefore, continuously controlling the current pulses as a function of the instantaneous operating conditions can prevent the fluctuations detailed above when the gas flow changes to accommodate production.

As per Ohm's law, this gap voltage can be given by an impedance of the gas flowing in the gap multiplied by the current flowing through it. The impedance of the gap is a nonlinear function of the operating conditions of the ozone generator. For this reason, the resulting ozone yield plotted as a function of the current flowing through the gap can have a maxima representing an optimal ozone yield. The power supply unit disclosed herein is designed to perform at that maximum of the ozone yield, for any operating conditions of the ozone generator, for any output ozone concentration and for any desired ozone production rate.

As briefly discussed above, the ozone yield can be dependent (i) on the design of the ozone generator, (ii) on the operating conditions of the ozone generators, and (iii) on the electrical parameters of the power supply unit.

The design of the generator can include the gap width, the dielectric material used, the surface finish, the electrode material, the dielectric surface dimension, the tolerance on the parts, and the cooling system, for instance.

The operating conditions can depend on the ozone production rate, the output ozone concentration, the mass flow rate of the gas, the input pressure, the output pressure, the input temperature, the output temperature, the composition of the gas (pure oxygen, nitrogen, ozone, air, other), oxide build-ups on the intervening surfaces, surface conditioning, loss of dielectric surface (electrodes), and contamination.

The electrical parameters can depend on the current density (depending on the total electrodes of the ozone generator), the amplitude of the current pulses, a pulse width of the current pulses, the frequency of the current pulses, the electrical losses in the power supply unit, and an amount of electrical power consumed.

The parameters listed in group (i) are calculated at the time of designing the ozone generator, and can depend on the desired ozone production rate. The details of the design can vary from one manufacturer to another. The design is usually a trade-off to optimize the operation (reduce costs) over the operating range desired by the client. Since the design cannot be varied during operation, the optimal ozone yield is only attained at a few specific production points in the wide operating range.

The parameters listed in group (ii) vary continuously during operation. The time range spans from seconds for pressure and temperature to months and years for the electrodes oxides and surface conditioning. Large ozone generators typically use at least few kilowatts of energy and are built from many identical dielectric surfaces in parallel in order to increase the capacitance. Some of these dielectric surfaces can fail over time and be disconnected by fuses, which reduces the ozone generator active surface. These are variables that can affect the ozone yield. Some of which can be individually measured by sensors incorporated in the ozone generator (pressure, temperature, concentration), some other are not measurable (surface coating degradation, contamination, etc.).

The parameters listed in group (iii) can be controlled by an intelligent power supply unit in order to enhance the ozone yield and the ozone production rate as a function of the instantaneous operating conditions of the ozone generator. And this was not achieved before the intelligent power supply unit described herein.

Indeed, it was known to operate the ozone generator by providing current pulses having variable amplitude and fixed frequency. It was also known to operate the ozone generator by providing current pulses having variable frequency and generally fixed amplitude. These methods allow a maximum ozone yield only at a specific ozone production rate, and can modify only one electrical parameter of the power supply unit. For this reason, ozone generator users generally chose the power supply unit providing maximum ozone yield for a specific (or desired) ozone production rate. By doing so, the ozone generating system may fail to provide the optimal ozone yield over the full range of the operating conditions.

Consequently, these methods may not be adapted to consider unpredictable and instantaneous variations of the operating parameters of the ozone generator (pressure, temperature, concentration, surface coating degradation, contamination.) within an ozone generator implanted in a real plant and variations that can be due to wear and/or environmental changes in the ozone generator.

The intelligent power supply unit selects the most efficient current pulse amplitude and frequency as a function of the instantaneous operating conditions, the intelligent power supply can increase the ozone production rate and also increase the ozone yield. For instance, it can take few minutes for the ozone production to stabilize once at least one of the electrical parameters is adjusted. Henceforth, the intelligent power supply can preferably adjust its parameters at each five minutes, ten minutes or fifteen minutes. As the frequency can vary from 1 Hz to 50 kHz, a large quantity of current pulses can be affected by the adjustments of the intelligent power supply, which can considerably influence the ozone yield and ozone production rate.

Figure 3:
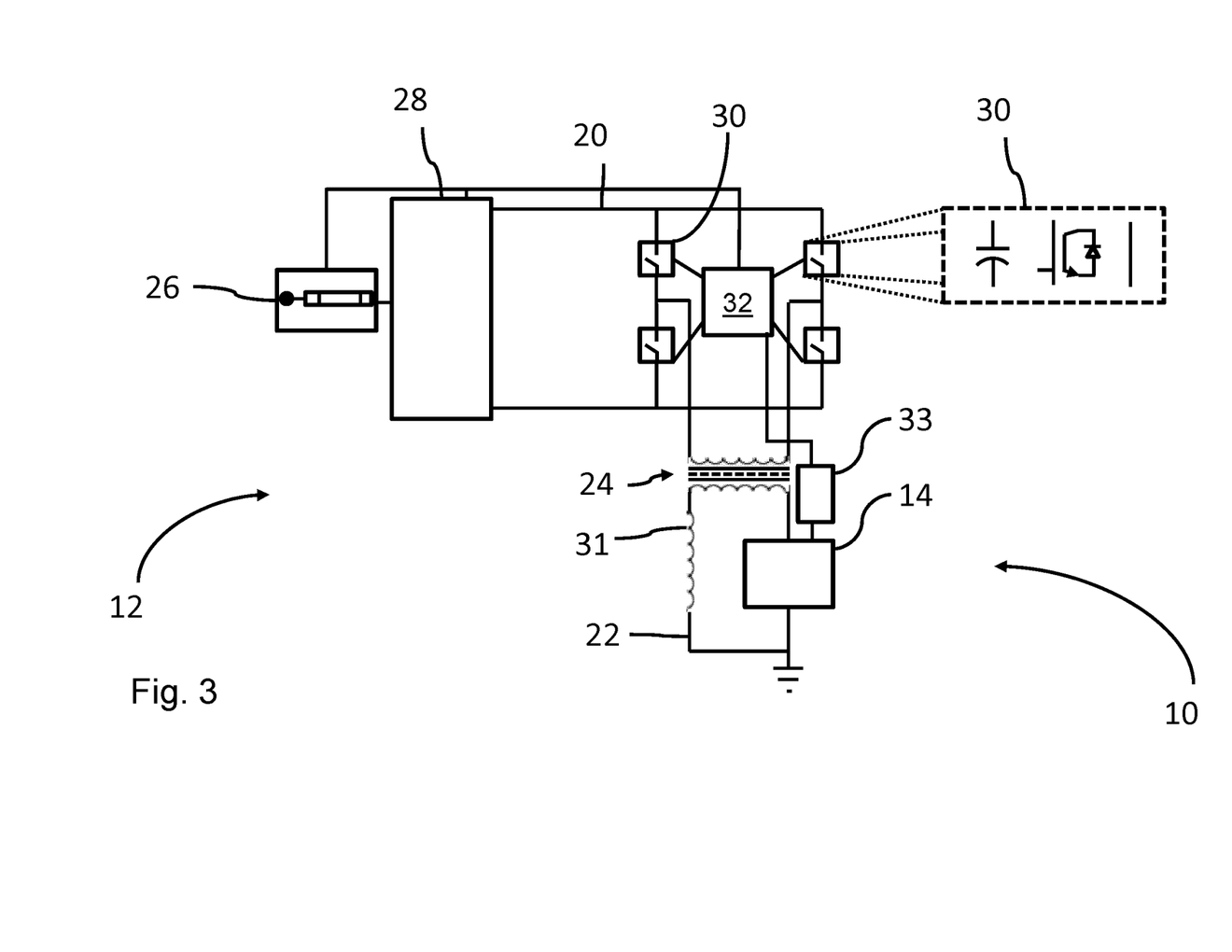
FIG. 3 is a bloc diagram illustrating an example of a power supply unit incorporating a computer.

FIG. 3 is a bloc diagram of an example of the intelligent power supply unit 12. The latter can have an electrical circuit having a primary circuit 20 and a secondary circuit 22 coupled to each other by a high voltage transformer 24. On one hand, the primary circuit 20 typically can have an alternative current source 26 providing electricity, a rectifier 28 and a H bridge (or a half-H bridge for smaller ozone generating systems) having electrical switches 30, such as a semiconductor switch implemented with Insulated Gate Bipolar Transistors (IGBTs) or Metal Oxide Field Effect Transistors (MOSFET), and which load is connected to a first winding of the high voltage transformer 24. The secondary circuit has a second winding connectable to an inductance 31 and to the ozone generator 14. As it is understood by one skilled in the art, the high voltage transformer 24 can be replaced by other topologies which can be used to achieve similar results. For instance, the high voltage transformer 24 can be a step-up transformer if the primary circuit is driven at a lower voltage. Alternatively, if the high voltage transformer 24 is not provided, the inductance 31 can be sufficient. As readily understood, the high voltage transformer 24 is generally used to raise the voltage supplied from the primary circuit 20 to the secondary circuit 22 and to provide electrical isolation. The power supply unit 12 can also have a computer 32 or alternatively, any computing means such a processor, a controller and/or a microcontroller that can be connectable to the ozone generator 14. When connected to the ozone generator 14, the computer 32 is adapted to receive all kind of information from sensors 33 such as the input pressure ($P_i$) of the input gas, the mass flow rate ($\dot{m}$) of the input gas, the input temperature ($T_i$) of the input gas, the output pressure ($P_o$), the output temperature ($T_o$), and the output ozone concentration ($C_{O3}$), for instance. Moreover, the computer 32 can be connected to the electrical switches 30 of the H bridge, as well as the alternative current source 26 and the rectifier 28.

Since the computer 32 is adapted to receive the instantaneous operating parameters of the ozone generator 14, it can send signals having instructions therein to any of the components of the electrical circuit in order to track a maximum of the ozone yield, for a desired ozone production rate, for instance. Consequently, the intelligent power supply unit 12 can adapt the current pulses that are provided to the ozone generator 14 as a function of the conditions of the ozone generator 14 itself thereby allowing continuous amelioration of the ozone yield.

In other words, the computer 32 can incorporate a Maximum Yield Point Tracking (MYPT) algorithm in order to iteratively provide an enhanced ozone yield. This MYPT algorithm ensures that the losses of the ozone generator 14 are taken into account. The MYPT algorithm which is stored on a storage media of the computer 32, and that has instructions inscribed thereon for performing predefined steps. Accordingly, the MYPT algorithm can control the amplitude of the current pulses for attaining an optimal ozone yield. It can also control the frequency of the current pulses in order to meet the desired ozone production rate. The computer 32 can be provided in the form of an electrical circuit board such as a printed circuit board (PCB) having the electronic components all mounted thereon.

The intelligent power supply described herein is adapted to perform an amplitude control loop, or a frequency control loop, and/or any other combination of amplitude modification and frequency adjustment based on a resulting ozone yield, which is measured once the process is stabilized.

Figure 4:
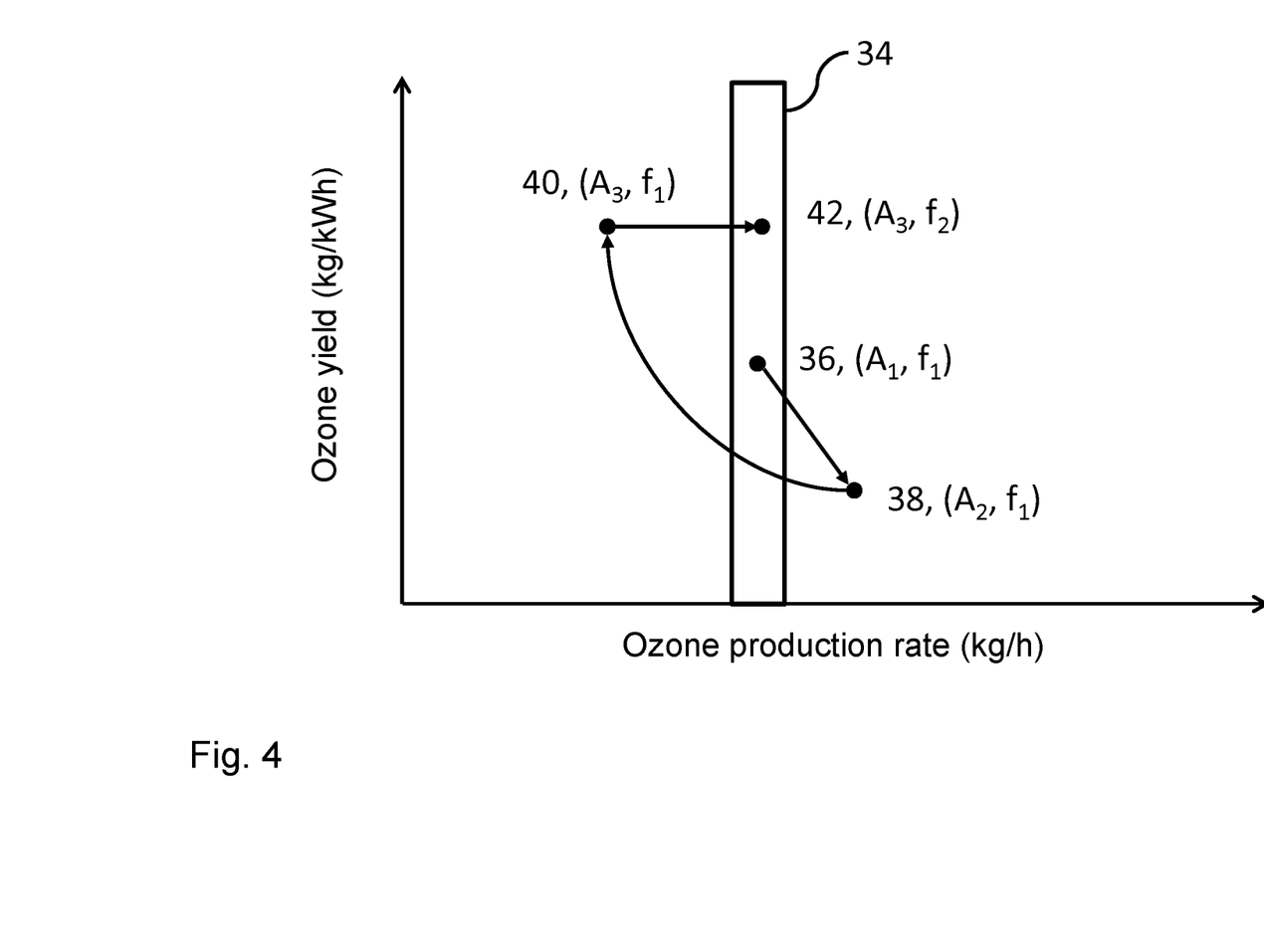
FIG. 4 is a graph showing the ozone yield as a function of an ozone production rate illustrating an amplitude control loop by the power supply unit of FIG. 3.

For instance, FIG. 4 shows an example of a graph showing the ozone yield as a function of the ozone production rate at four different moments 36, 38, 40 and 42. For instance, the power supply unit initiates a amplitude control loop by modifying the amplitude from $A_1$ to $A_2$. After the process is stabilized, the ozone yield associated with 38 is measured to be lower than the one previously measured at 36. Henceforth, the power supply unit has perform an inefficient step. To overcome this inefficient step, it can remodify the amplitude of the current pulses to $A_3$. At 40, it is measured that the ozone yield is higher than the one measured at 36, thus the power supply unit has achieved an improved ozone yield. Once the ozone yield has been correctly enhanced, the power supply unit can perform a frequency adjustment in order to reach point 42, where the ozone production rate falls within the range of the desired ozone production of the ozone generator user.

Figure 5:
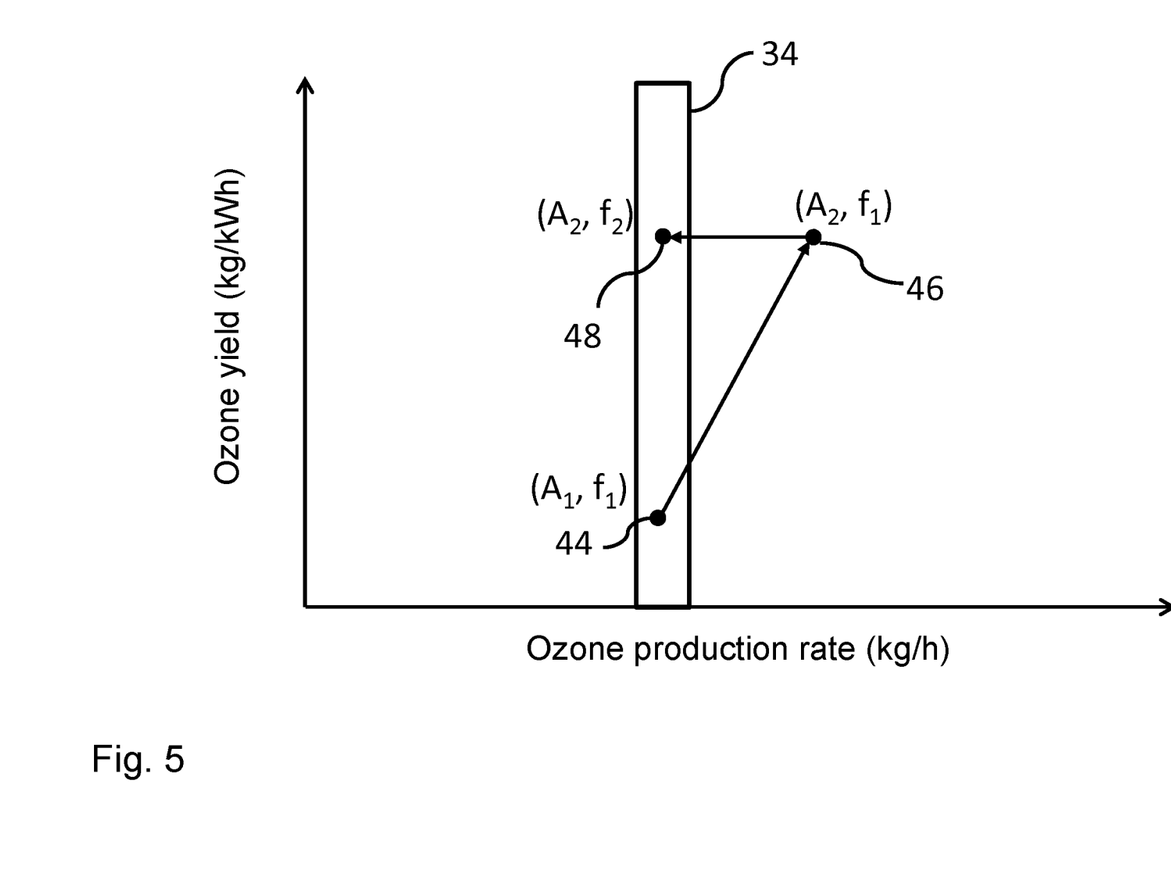
FIG. 5 is a graph showing the ozone yield as a function of an ozone production rate illustrating an amplitude modification followed by a frequency adjustment performed by the power supply unit of FIG. 3.

FIG. 5 shows an example of a graph showing the ozone yield as a function of the ozone production rate at three moments 44, 46 and 48. The zone 34 identifies the desired ozone production rate (or ozone production objective) required by the ozone generator user. In the first iteration of the intelligent power supply unit, the current pulses is characterized by amplitude $A_1$ and a frequency $f_1$, see point 44. Typically, the first point of operation can have an ozone production rate within the desired ozone production rate. As the ozone yield is low, the computer can modify, based on a model (predetermined table) relying on known experimental results, the current pulses to amplitude $A_2$, see point 46. Consequently, the ozone yield achieved is higher than the ozone yield of point 44. Afterwards, the power supply unit can therefore adjust the frequency of the current pulses to frequency $f_2$, see point 48. At it can be noticed, the ozone yield rate has been enhanced in only one iteration. Now, the computer can be adapted to perform an iteration over every couple of minutes, for instance, which can contribute to operate the ozone generator at optimal conditions at all time. If, for instance, the iteration leads to an ozone yield below the initial ozone yield, the computer can sequentially perform other iterations in order to enhance the ozone yield.

Figure 6:
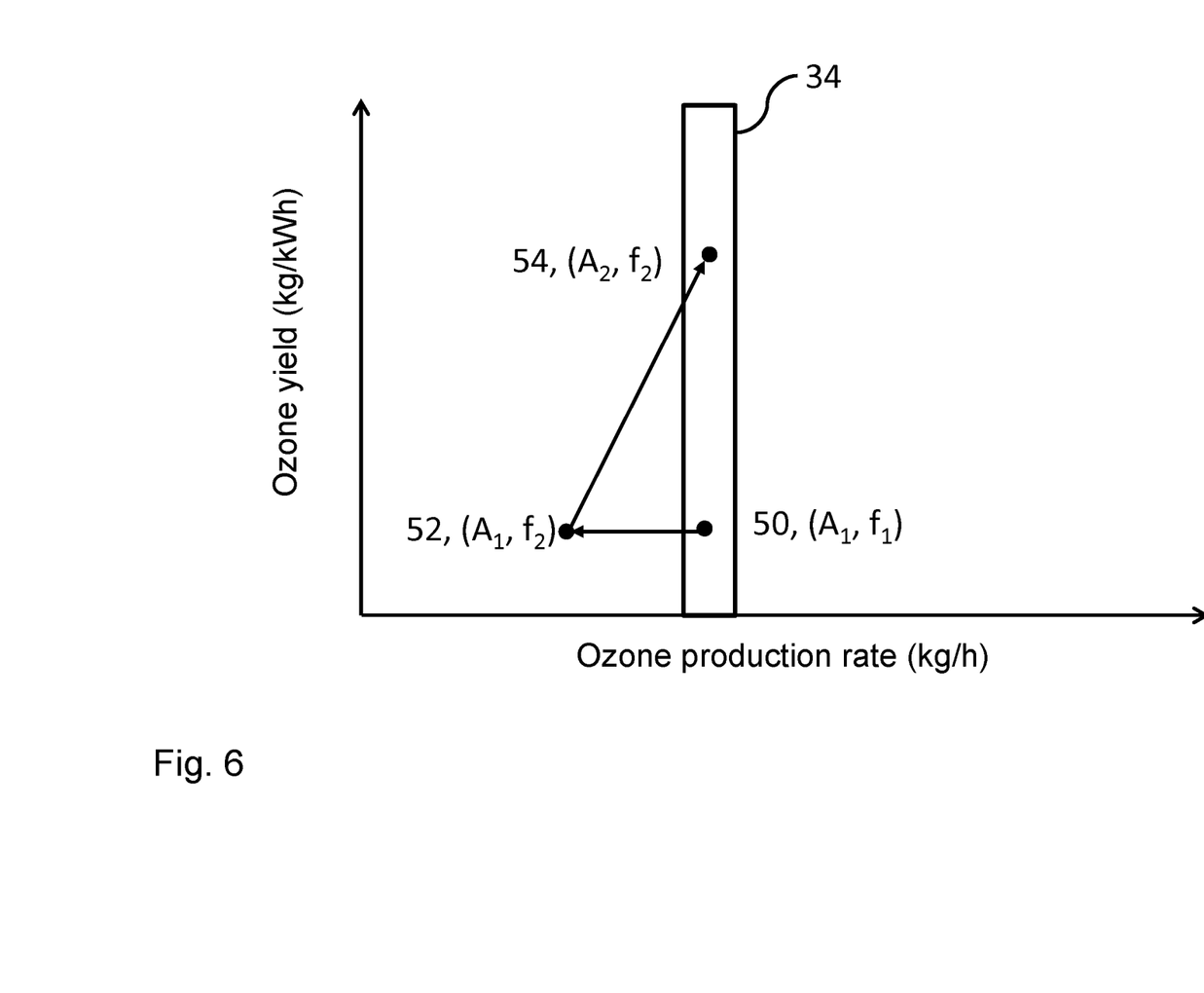
FIG. 6 is a graph showing the ozone yield as a function of an ozone production rate illustrating a frequency adjustment followed by an amplitude modification performed by the power supply unit of FIG. 3.

Alternatively, FIG. 6 shows an example of a graph showing the ozone yield as a function of the ozone production rate at three moments 50, 52 and 54. The zone 34 still identifies the desired ozone production rate. At first, the amplitude of the current pulses is $A_1$ and the frequency is $f_1$. The power supply unit, in order to improve the ozone yield, can adjust the frequency from $f_1$ to $f_2$ to reach the ozone yield and the ozone production rate identified by 52. Afterwards, the power supply unit can modify the amplitude from $A_1$ to $A_2$ to reach the desired ozone production rate. As it can be understood from FIGS. 5 and 6, either one of the amplitude or the frequency of the current pulses can be changed at first. Subsequently, the other one of the amplitude and the frequency of the current pulses can be changed accordingly to meet the desired ozone production.

Figure 7:
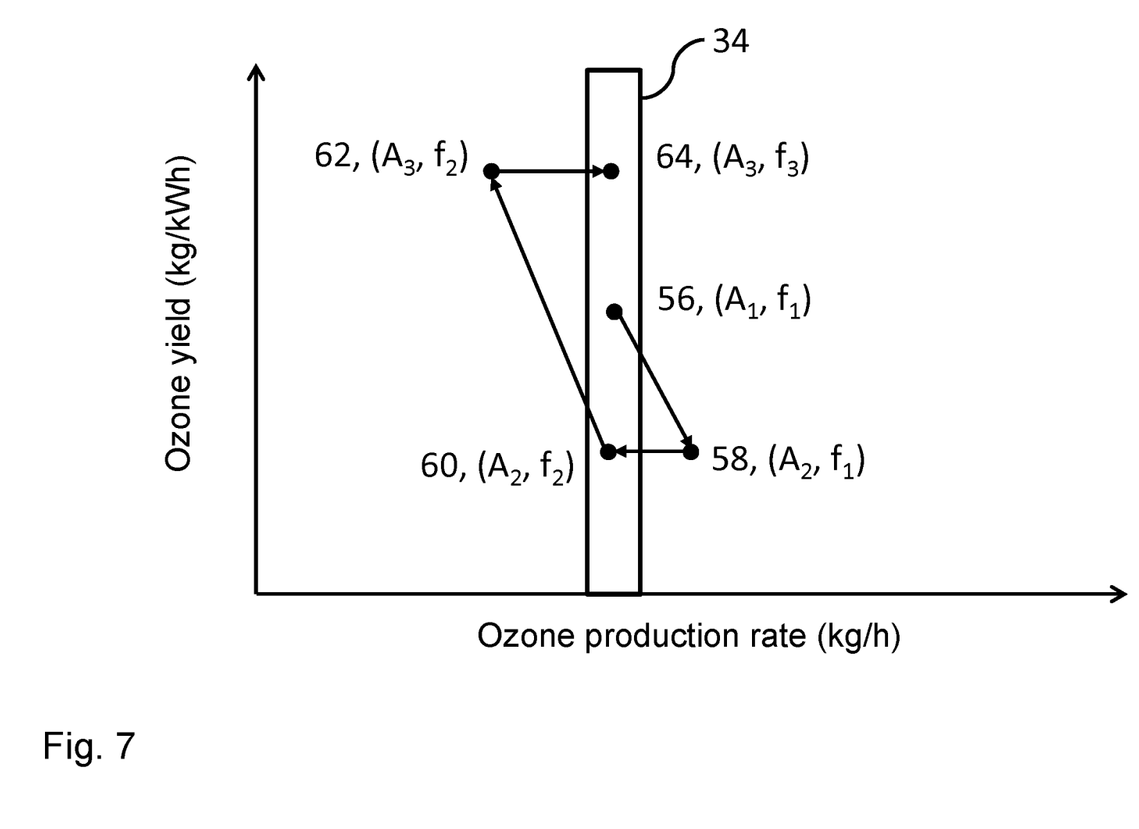
FIG. 7 is a graph showing the ozone yield as a function of an ozone production rate illustrating an amplitude control loop interspersed with a frequency control loop performed by the power supply unit of FIG. 3.

FIG. 7 shows an example of a graph showing the ozone yield as a function of the ozone production rate at five moments 56, 58, 60, 62 and 64. In this particular situation, the power supply unit can perform an amplitude control loop interspersed with a frequency control loop. In this case, the computer can be adapted to perform arbitrary iterations. The zone 34 still identifies the desired ozone production rate required by the ozone generator user. In a first arbitrary iteration of the intelligent power supply unit, the current pulses is characterized by amplitude $A_1$ and by frequency $f_1$, see point 56. First, the computer modifies the amplitude of the current pulses to amplitude $A_2$, see point 58. At this point, the desired ozone production rate is not respected as it is higher than the desired ozone production rate. The computer then adjusts the frequency to frequency $f_2$, as shown at point 60. This iteration is identified as an inefficient iteration since the ozone yield of point 60 is lower than the ozone yield of point 56. Henceforth, the computer can initialise another iteration, based on the results of the previous inefficient arbitrary iteration. More particularly, the power supply unit therefore modifies the amplitude of the current pulses to amplitude $A_3$ to reach point 62. As it can be noticed, the ozone production rate is lower than the desired ozone production rate, but the ozone yield is superior than at points 56 and 60. Thus, the computer readjusts the frequency to frequency $f_3$, which leads the ozone generating system to reach point 64, in the desired production rate, where the ozone yield and the ozone production rate have been enhanced using the amplitude control loop and the frequency control loop.

Figure 8:
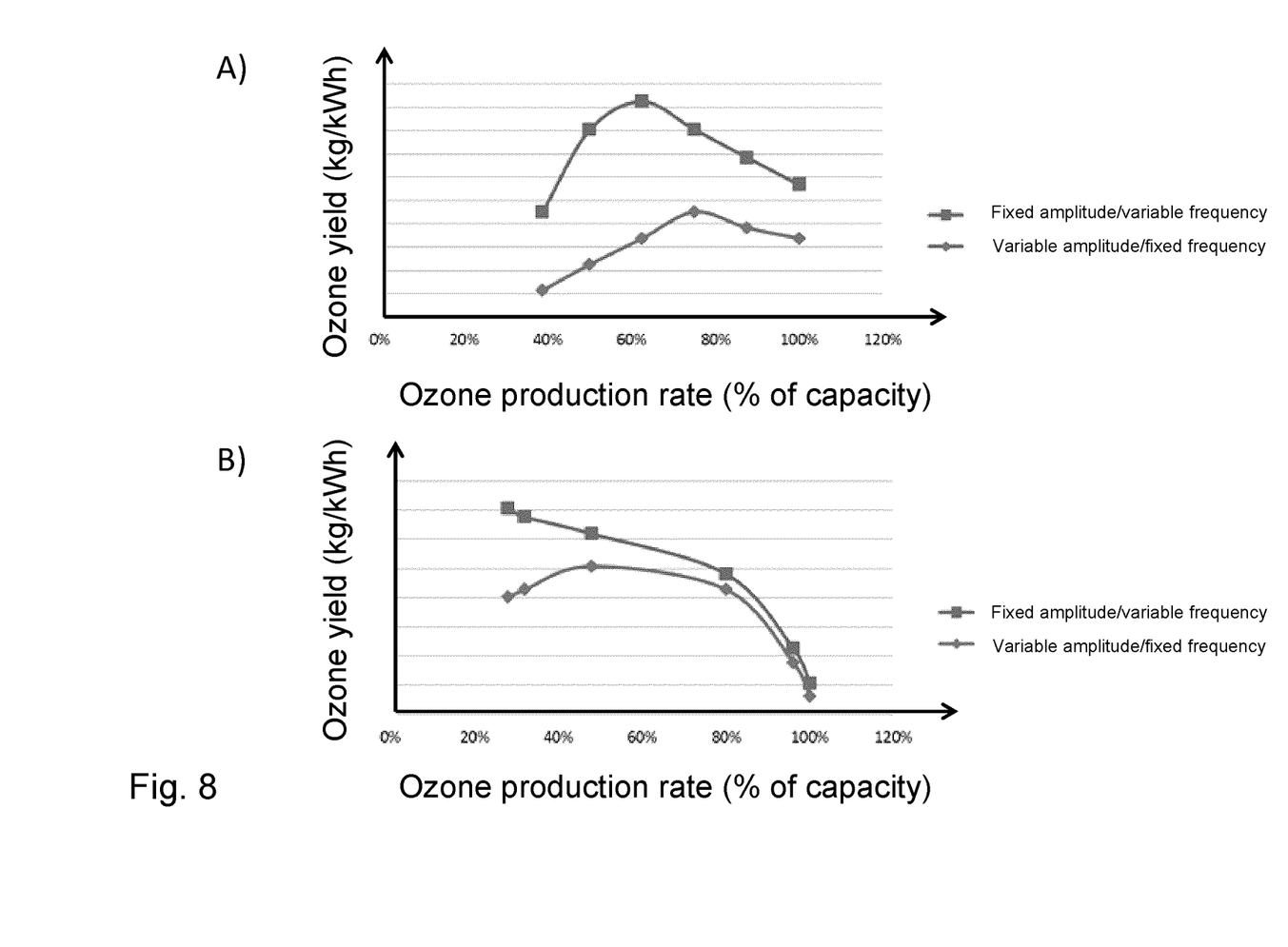
FIG. 8A is a graph showing the ozone yield as a function of an ozone production rate for an output ozone concentration of 6%.
FIG. 8B is a graph showing the ozone yield as a function of an ozone production rate for an output ozone concentration of 12%.

FIGS. 8A and 8B show graphs respectively showing the ozone yield as a function of the % of capacity of the optimal ozone production rate for output ozone concentrations of 6% and 12%. As it can be seen from these two graphs, the way the ozone yield varies as a function of the output ozone concentrations is highly representative of how hard it is for typical (fixed amplitude/variable frequency and variable amplitude/fixed frequency) ozone generating systems to provide an enhanced ozone yield for any operating conditions of the ozone generator. With regards to FIG. 8B, it was noticed that for higher ozone concentration, current pulses having a higher amplitude could improve the ozone yield at low ozone production rates, but showed a diminished improvement for higher ozone production rates. At these high production rates, for instance, the intelligent power supply unit can raise the amplitude of the current pulses, and adjust the frequency of the current pulses in order to maintain the yield advantage. As it had been observed, continuously adjusting the current pulses as a function of the operating parameters of the ozone generator can provide a higher ozone yield, and therefore, reduce costs associated with consumed oxygen, and electrical power, and with expensive cooling devices associated to the ozone generator.

It is noted that the ozone production rate can vary linearly with the frequency of the current pulses. Henceforth, increasing the frequency can lead to an increase in the ozone production rate. However, the ozone yield does not vary linearly with the frequency. Since a high frequency generates a high number of discharges in the gap, which leads to a temperature increase, and to an ozone concentration increase. As it is discussed above, high temperature and high ozone concentration are two factors that can negatively affect the ozone yield. Therefore, it can be advantageous to refer to a predefined table having well-known results of ozone yields and ozone production rates depending on the ozone concentration in order to strategically select the amplitude or the frequency of the current pulses. Alternatively, it can be advantageous to provide an algorithm which can predict the amplitude and the frequency of the current pulses in order to improve the ozone yield as a function of the ozone production rate based on the well-known results, or on theoretical or experimental calculations. It is readily understood that the power supply unit preferably modifies the amplitude of the current pulses in a first iteration, and afterwards adjusts the frequency of the current pulses. Although it is preferable, modifying the frequency of the current pulses and adjusting the amplitude thereafter can also lead to ozone yield enhancement.

As can be seen therefore, the examples described above and illustrated are intended to be exemplary only. Although this specification describes a power supply unit for an ozone generator, the power supply unit can be used for any other dielectric barrier discharge technologies, it can be used for any application involving corona discharges. For instance, for cold plasma discharge ozone generators, excimer lamps and lasers, and material surface treatment using electrical corona discharges. The scope is indicated by the appended claims.

What is claimed is:

1. An apparatus configured for carrying out a process for powering an ozone generator, the apparatus comprising:
a pulsed current generator for supplying current pulses to drive the ozone generator; and
a computer connected to the pulsed current generator and adapted to retrieve an amount of ozone generated and an amount of electricity consumed; the computer having a readable memory having recorded thereon instructions for execution by the computer, the instructions comprising the steps of:
determining a first ozone yield based on both an amount of ozone generated and an amount of electricity consumed during a first period of time during which the ozone generator is driven by the pulsed current generator at a amplitude and a frequency of the current pulses;
modifying one of the amplitude and the frequency of the current pulses based on the first ozone yield;
determining a second ozone yield based on both an amount of ozone generated and an amount of electricity consumed during a second period of time during which the ozone generator is driven by the modified current pulses;
effecting one of remodifying and maintaining the modified current pulses based on the second ozone yield, wherein said remodifying includes repeating the steps of modifying said one of the amplitude and the frequency and determining iteratively to enhance the second ozone yield;

determining an ozone production rate based on the amount of ozone generated during the second period of time; and adjusting the other one of the amplitude and the frequency of the modified current pulses based on a comparison between the determined ozone production rate during the second period of time and a desired ozone production rate, wherein when the one is the amplitude the other one is the frequency and vice versa.

2. The apparatus of claim 1 wherein said instructions further comprise the steps of:

determining an adjusted ozone production rate based on the adjusted current pulses during another period of time; and effecting one of readjusting and maintaining the modified current pulses based on the adjusted ozone production rate.

3. The apparatus of claim 1, wherein said modifying one of the amplitude and the frequency of the current pulses includes modifying the amplitude of the current pulses and said adjusting the other one of the amplitude and the frequency includes adjusting the frequency of the current pulses.

4. The apparatus of claim 3, wherein said modifying further comprises increasing the amplitude of the current pulses to increase the second ozone yield and wherein said adjusting further comprises decreasing the frequency of the current pulses to adjust the ozone production rate to the desired ozone production rate.

5. The apparatus of claim 1, wherein said modifying one of the amplitude and the frequency of the current pulses includes modifying the amplitude of the current pulses.

6. The apparatus of claim 1, wherein said modifying is based on an ozone concentration of an ozonized gas using a predefined table.

7. The apparatus of claim 1, wherein said modifying further comprises decreasing the amplitude of the current pulses to increase the second ozone yield and wherein said adjusting further comprises increasing the frequency of the current pulses to adjust the ozone production rate to the desired ozone production rate.

8. The apparatus of claim 1, wherein said modifying and said adjusting are performed iteratively until said determined ozone production rate meets said desired ozone production rate.

* * * * *